Aug. 19, 1952   A. C. CHRISTENSEN   2,607,199
METHOD OF COOLING AND CONVEYING MATERIAL
Filed Aug. 7, 1947   2 SHEETS—SHEET 1
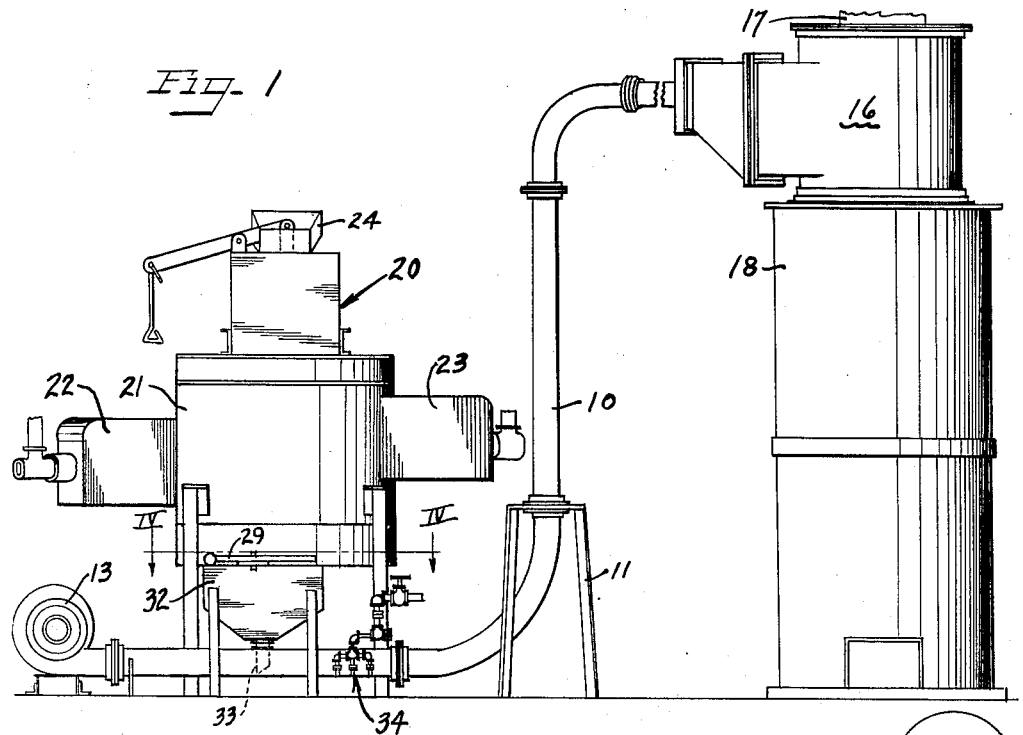
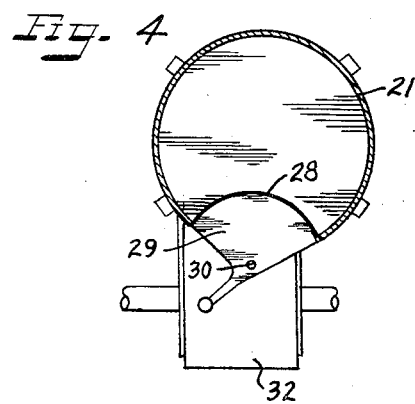
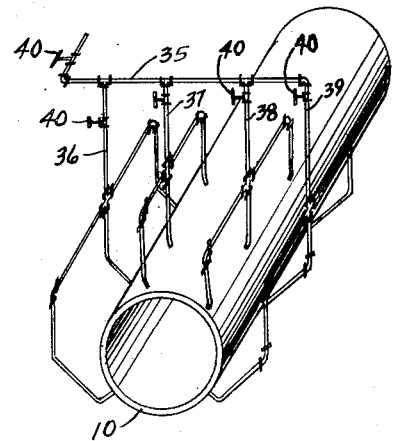
Inventor
ALFRED C. CHRISTENSEN Aug. 19, 1952   A. C. CHRISTENSEN   2,607,199
METHOD OF COOLING AND CONVEYING MATERIAL
Filed Aug. 7, 1947   2 SHEETS—SHEET 2

Inventor
ALFRED C. CHRISTENSEN
by
Attys.

Patented Aug. 19, 1952

2,607,199

UNITED STATES PATENT OFFICE 2,607,199

METHOD OF COOLING AND CONVEYING MATERIAL

Alfred C. Christensen, Chicago, Ill., assignor, by mesne assignments, to Herbert Simpson Corporation, Chicago, Ill., a corporation of Illinois Application August 7, 1947, Serial No. 767,303

1 Claim. (Cl. 62—1)

This invention relates to a method of and apparatus for cooling and conveying material. More particularly this invention relates to apparatus for cooling and conveying granular material, such as heated foundry sand, by subjecting the material to a current of air or other gas and injecting a spray of liquid or water over the material as it is being moved along by the air current.

While this method of cooling and conveying material and the apparatus herein disclosed for carrying out this method is particularly adapted to cooling and conveying heated sand in a foundry, and will hereinafter be specifically described for such an application, it is to be understood that this invention is not limited to such a usage, being generally useful for cooling and conveying any powdered or granular material.

It is an important object of this invention to provide a method of cooling heated material that comprises spraying a cooling liquid into the material in a closed conduit and supplying sufficient air through the conduit to absorb the vapors produced by the evaporation of the liquid.

Another object of this invention is to provide a method of cooling heated material such as sand that makes use of the combined cooling effect produced by the passage of air through the sand and by the evaporation of a liquid sprayed into the sand.

A still further object of this invention resides in the provision of apparatus for cooling a relatively large quantity of granular material as it is being conveyed from one point to another.

A further object of this invention is the provision of apparatus for cooling and conveying a granular material or the like by using one of the mediums employed for cooling the material as a means of conveying it.

Another and further object of this invention is to provide apparatus by which the relative amount of water and of air can be readily varied to control the cooling effect produced.

According to the general features of this invention there is provided a conduit for receiving a stream of heated granular material, such as reclaimed foundry sand. A blower positioned at one end of the conduit is arranged to blow into the sand and carry it along through a spray of cooling water. Cooling of the material is effected by the passage of the air through the material and also by the evaporation of the water sprayed into the material.

Other and further features, objects and advantages of this invention will be apparent to one skilled in the art from the following detailed description taken in connection with the accompanying drawings in which:

Figure 1 is a side elevational view of the cooling and conveying apparatus of this invention;

Figure 3 is a fragmentary prospective view of the spray apparatus of this invention;

Figure 4 is a horizontal sectional view taken substantially on line IV—IV of Figure 1 looking in the direction indicated by the arrows.

As shown on the drawings:

Figure 2:
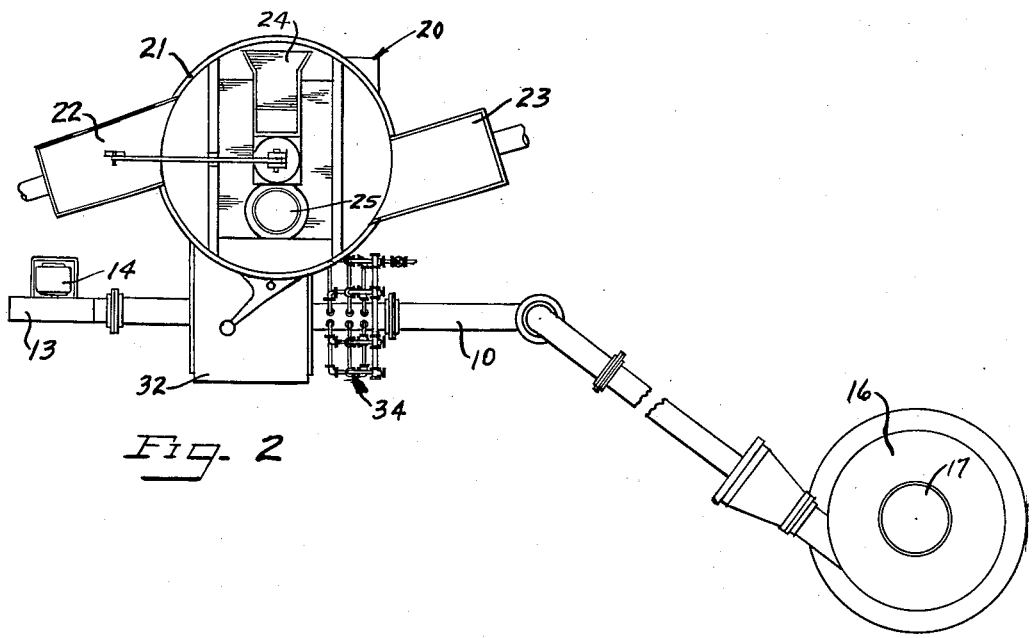
Figure 2 is a plan view of the apparatus of Figure 1.

In Figure 1 is illustrated a complete assembly of apparatus adapted to carry out the cooling process of this invention. Reference numeral 10 indicates a multiple section pipe or conduit supported by a frame structure 11. This pipe may be made of wrought iron and may assume suitable configurations depending upon the installation. Since the material being cooled passes through the pipe at a relatively high velocity, it is obvious that if the material has abrasive characteristics, any elbow members should be made of a special wear resistant material.

In the embodiment shown in Figure 1, the pipe 10 is arranged to receive air at one end from a blower 13 driven by a motor 14, Figure 2. The pipe is connected at its opposite end to a collector unit 16 which permits the air to escape through an exhaust connection 17 while allowing the material which has been carried along by the air to drop into a storage bin 18 which communicates with the collector, being mounted immediately therebelow.

One portion of the pipe 10 is positioned adjacent a typical sand reclaiming unit 20 which includes a casing 21, burners 22 and 23, an inlet port 24, an exhaust port 25 and an inlet chute 26. This unit may be of any of the well known types of reclaiming units wherein spent foundry sand is tumbled and worked while being subjected to heat treatment for removing carbon and unburned bonding material therefrom.

To afford access from the reclaiming unit 20 to the conduit 10 there is provided in the base of the unit an opening 28, Figure 4, which is arranged to be closed by a door member 29 mounted for pivoting on a pivot pin 30. A hopper 32 is mounted directly below the opening 28 for receiving the sand from the unit, and delivering it through a tube 33 which has its lower end suitably positioned in the conduit 10. The lower end of the tube 33 is cut at an angle to permit easy entry of the sand into the conduit 10 as shown in Figure 1.

A spray chamber 34 is provided in the conduit 10 at a point adjacent the sand entry tube 33 but spaced downstream therefrom. As best seen in the diagrammatic drawing of Figure 3, a main header 35 communicates with four feeder lines 36, 37, 38 and 39. Each feeder line has three longitudinally spaced branches which are suitably secured in the wall of the conduit 10. Thus, there is provided three longitudinally spaced spray areas, each receiving water from four pipes spaced approximately 90° apart on the periphery of the conduit 10.

Regulating valves 40 are positioned in the main header 35 and in each of the four feeder lines, so that the sprays can be regulated both as to uniformity of pattern and as to quantity of water used.

In operation, the door 29 of the reclaiming unit is opened to admit heated sand into the hopper 32 which directs the sand into the conduit 10. It is to be noted that the cooling system of this invention may be used with feeder bins other than those attached to a sand reclaiming unit and that the feeding of the heated material therefrom may be continuous from the bin to the conduit 10, no intervening door member being necessary. As the sand enters the stream of air coming from the blower 13, it is carried along through the conduit 10 and through the spray chamber 34. The air traveling at a high velocity then carries the sand and water vapor up the conduit 10 to the collector 16, drying and further cooling the same during upward travel thereof to the collector 16 where the air with entrained moisture escapes through the exhaust connection 17, while the dry cool sand drops into the storage bin 18 in condition for reuse.

Figure 5:
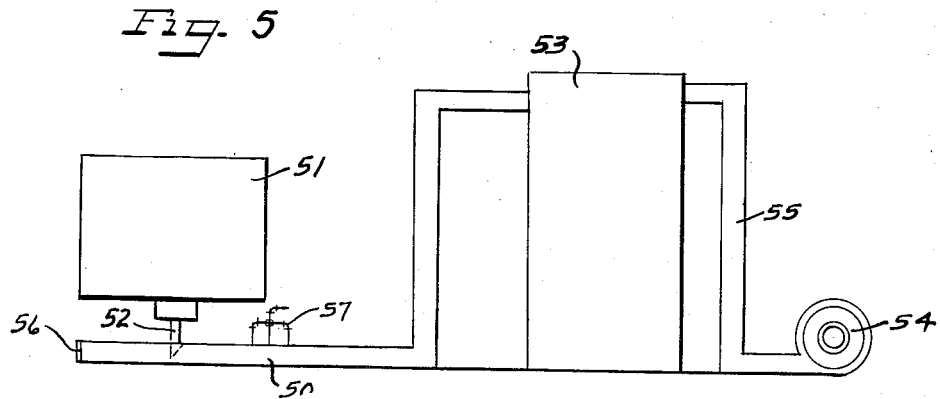
Figure 5 is a diagrammatic showing of a modified embodiment of the present invention.

In Figure 5 is shown a second embodiment of the apparatus of this invention. Reference numeral 50 is a conduit which receives heated material from a feeder bin 51 through a tube 52 disposed in the conduit 50. The cooled material is delivered to a storage bin 53 due to the air currents set up by a suction blower 54 which is connected on the downstream side of the storage bin 53 through a conduit 55. It is to be understood that the storage bin 53 will contain the necessary equipment for separating the material from the air and permitting the air to be exhausted through the conduit 55 while storing the material in the bin 53. An intake screen 56 may be positioned over the intake opening of the conduit 55 upstream from the connection of the tube 52 into the conduit 50. A spray chamber is provided by the piping connection 57 in substantially the same way as the spray chamber is provided in the embodiment disclosed in Figure 1.

In this embodiment, therefore, is shown an apparatus for cooling and conveying heated granular material by use of an air current that is induced by a suction blower.

The amount of material that can be cooled at any given time by the apparatus of this invention is dependent upon the amount of air blown or sucked through the conduit and the amount of water sprayed into the sand. It will be appreciated that when water is sprayed into the hot sand it will be evaporated and a steam vapor will fill the conduit. Sufficient air must be introduced into the conduit to absorb the water vapor in the air so that when the sand reaches the storage bin it will not only be at a lower temperature but will be in a substantially dry condition.

It has been found that sand can be cooled at the rate, for example, of 42 pounds per minute from an average of about 1610° F. to 208° F. by blowing air through the conduit at the rate of about 1300 cubic feet per minute and injecting water into the pipe at an average rate of about 0.8 of a gallon per minute. These are average values and may be interpreted to cover a range of initial sand temperatures of from 1550° F. to 1650° F. and a cooling rate of from 40 to 45 pounds of sand per minute.

Thus there is provided in this invention apparatus for cooling and conveying a granular material by making use of the combined cooling effects of air being blown through a closed conduit into the heated material and the cooling effect of a spray of cooling liquid directed into the material as it is conveyed through the conduit by the air current.

The apparatus is simple in construction and easy to assemble, and it is evident that the quantity of material that can be cooled and conveyed is limited only by the size of blower and conduit that is available. It is also manifest that the amount of cooling of any material can be closely controlled by regulating the amount of air and water that is directed into the conduit.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A method of cooling hot foundry sand comprising the steps of forcing a continuous current of air through a conduit at a high velocity, introducing sand into the conduit and establishing an air-floated stream of hot sand in the conduit, then injecting cooling water into said stream of hot sand for evaporation to reduce the heat content of the sand, then carrying the sprayed sand along said conduit a distance sufficient to remove the water vapor from the sand and further cool it, and exhausting the air with entrained water vapor to atmosphere and collecting the cooled substantially dry sand for use.

ALFRED C. CHRISTENSEN.

REFERENCES CITED

The following references are of record in the file of this patent:

UNITED STATES PATENTS

| Number | Name | Date |
|---|---|---|
| 495,359 | McClave | Apr. 11, 1893 |
| 584,988 | Clement | June 22, 1897 |
| 871,931 | Hansen | Nov. 26, 1907 |
| 984,188 | Brown | Feb. 14, 1911 |
| 1,139,091 | Weber | May 11, 1915 |
| 1,179,202 | McCarty | Apr. 11, 1916 |
| 1,205,323 | Cady | Nov. 21, 1916 |
| 1,469,993 | Carrier | Oct. 9, 1923 |
| 1,542,057 | Hovden | June 16, 1925 |
| 1,899,495 | Celaya | Feb. 28, 1933 |
| 2,020,034 | Knies | Nov. 5, 1935 |
| 2,261,560 | Pellas et al. | Nov. 4, 1941 |
| 2,264,610 | Beardsley | Dec. 2, 1941 |
| 2,278,701 | Karr | Apr. 7, 1942 |
| 2,305,811 | Oekl | Dec. 22, 1942 |